(12) United States Patent
Zawaideh et al.

(10) Patent No.: US 11,668,645 B2
(45) Date of Patent: Jun. 6, 2023

(54) SPECTROSCOPIC ELLIPSOMETRY SYSTEM FOR THIN FILM IMAGING

(71) Applicant: BRUKER NANO, INC., Santa Barbara, CA (US)

(72) Inventors: Emad Zawaideh, Carlsbad, CA (US); Chris Claypool, Carlsbad, CA (US)

(73) Assignee: BRUKER NANO, INC., Santa Barbara, CA (US)

( * ) Notice: Subject to any disclaimer, the term of this patent is extended or adjusted under 35 U.S.C. 154(b) by 0 days.

(21) Appl. No.: 15/732,179

(22) Filed: Sep. 27, 2017

(65) Prior Publication Data

US 2023/0010806 A1    Jan. 12, 2023

(51) Int. Cl.
| | | |
|---|---|---|
| *G01N 21/21* | (2006.01) | |
| *G01N 21/31* | (2006.01) | |
| *G01J 3/447* | (2006.01) | |
| *G02B 27/28* | (2006.01) | |
| *G02B 21/18* | (2006.01) | |
| *G02B 21/26* | (2006.01) | |

(52) U.S. Cl.
CPC ............ *G01N 21/211* (2013.01); *G01J 3/447* (2013.01); *G01N 21/31* (2013.01); *G02B 21/18* (2013.01); *G02B 21/26* (2013.01); *G02B 27/283* (2013.01); *G01N 2021/213* (2013.01); *G01N 2021/216* (2013.01); *G01N 2201/0683* (2013.01)

(58) Field of Classification Search
CPC ... G01J 3/447; G01N 21/31; G01N 2021/213; G01N 2021/216; G01N 2201/0683; G02B 21/18; G02B 21/26; G02B 27/283
USPC .......................................................... 356/327
See application file for complete search history.

(56) References Cited

U.S. PATENT DOCUMENTS

| | | | |
|---|---|---|---|
| 7,492,455 B1 * | 2/2009 | Johs ....................... G01J 3/0224 | 356/369 |
| 2010/0245819 A1 * | 9/2010 | Li ....................... G01B 11/0641 | 356/369 |
| 2014/0375981 A1 * | 12/2014 | Wang .................... G01N 21/956 | 356/51 |
| 2016/0076942 A1 * | 3/2016 | Zawaideh ................. G01J 4/04 | 356/364 |

FOREIGN PATENT DOCUMENTS

WO    WO-2016127163 A1 *    8/2016    ....... G01N 33/54313

* cited by examiner

*Primary Examiner* — Tarifur R Chowdhury
*Assistant Examiner* — Omar H Nixon
(74) *Attorney, Agent, or Firm* — Quarles & Brady LLP; Yakov Sidorin

(57) ABSTRACT

A spectroscopic ellipsometry system and method for thin film measurement with high spatial resolution. The system includes a rotating compensator so that spectroscopic ellipsometric and imaging ellipsometric data are collected simultaneously with the same measurement beam. Collecting both ellipsometric data sets simultaneously increases the information content for analysis and affords a substantial increase in measurement performance.

22 Claims, 15 Drawing Sheets

Prior Art

Commercial Spectroscopic Reflectometry System

Top Region

Spectroscopic Ellipsometry System

Top Region

Prior Art

Commercial Spectroscopic Reflectometry System

Bottom Region

Spectroscopic Ellipsometry System

Bottom Region

Prior Art

Commercial Spectroscopic Reflectometry System

Left Region

Spectroscopic Ellipsometry System

Left Region

Prior Art

Commercial Spectroscopic Reflectometry System

Right Region

Spectroscopic Ellipsometry System

Right Region

Prior Art
Commercial Spectroscopic Reflectometry System

Center Region

SPECTROSCOPIC ELLIPSOMETRY SYSTEM FOR THIN FILM IMAGING

FIELD OF THE INVENTION

The present invention relates to optical systems for thin film measurement using combined spectroscopic and imaging ellipsometry methods.

BACKGROUND OF THE INVENTION

In the production of semiconductor devices, precise film characterization is critically important because productivity and yield is largely determined by film quality and uniformity. Spectroscopic ellipsometry (SE) is widely used in the semiconductor and microelectronic industries as a non-contact and non-destructive optical technique for thin film characterization and process control. The broad acceptance of SE results from its high sensitivity and reproducibility, as well as its ability to measure many material types including dielectrics, semiconductors, metals, polymers, biological coatings, and multilayers of these films. Typically, SE measurements are carried out with a measurement beam diameter ranging from 2 mm to 50 µm, and a wafer map is obtained with point-by-point mechanical scanning techniques. However, the lateral resolution for SE is limited by the measurement spot size (which is typically about 50 urn or larger), and the measurement time limits the effective wafer coverage. As transistor dimensions continue to shrink, semiconductor manufacturers require metrology tools with increased spatial resolution and wafer coverage in order to achieve effective process control.

Thin Film Interference

Thin-film interference is a natural phenomenon in which light waves reflected by the upper and lower boundaries of a thin film interfere with one another, either enhancing or reducing the reflected light. Studying the light reflected or transmitted by a thin film can reveal information about the thickness of the film and/or the effective refractive index of the film medium. Thin films have many commercial applications including anti-reflection coatings, mirrors, and optical filters. A thin film is a layer of material with thickness in the sub-nanometer to micron range. As light strikes the surface of a film it is either transmitted or reflected at the upper surface. Light that is transmitted reaches the bottom surface and may once again be transmitted or reflected. Light reflected from the upper and lower surfaces will interfere either destructively or constructively. The degree of constructive or destructive interference between the two light waves depends on the difference in their phase. This difference in turn depends on the wavelength of the light, the thickness of the film layer, the refractive index of the film, and the angle of incidence of the original wave on the film. Additionally, a phase shift of 180° may be introduced upon reflection at a boundary depending on the refractive indices of the materials on either side of the boundary. This phase shift occurs if the refractive index of the medium the light is travelling through is less than the refractive index of the material it is striking. Techniques utilizing reflected light are available for non-destructive testing or monitoring of thin films.

Ellipsometry

Ellipsometry is based on the change in polarization state of specularly reflected light. From analysis of such polarization changes it is possible to deduce the properties of the reflecting surface. The basic measurement parameters of ellipsometry are the amplitude ratio ($\Psi$) of the reflected light and the phase difference ($\Delta$) of the reflected light, and the complex reflectance ratio $\rho$ defined as $$\rho = \frac{R_p}{R_s} = \tan(\Psi)e^{i\Delta}$$

where $R_p$ and $R_s$ are the complex reflection coefficients of light polarized parallel (p) and perpendicular (s) to the plane of incidence. Physical information about the sample, such as the thickness of the film or the refractive index of the material can be deduced through model-based regression of the $\Psi$ and $\Delta$ values. Since the model-based regression is limited to the information content available from the experimental data, ellipsometry is often performed at multiple wavelengths to provide $\Psi$ and $\Delta$ as a function of wavelength (e.g., spectroscopic ellipsometry) to increase the available information.

Microscopic Techniques

As transistor dimensions continue to shrink, semiconductor manufacturers require metrology tools with increased spatial resolution and wafer coverage in order to achieve effective process control. Although well-established microscopy techniques including atomic force microscope (AFM), scanning electron microscope (SEM), and transmission electron microscope (TEM) allow the visualization of small structures and scales, they are "local", destructive, and unsuitable for high volume manufacturing. To meet the spatial resolution and coverage requirements for future integrated circuit manufacturing, the thin film metrology technique must be fast and nondestructive, with high sensitivity and reproducibility.

Imaging Ellipsometry

Imaging ellipsometry (IE) is a technique that has been developed for the quantification and visualization of the lateral thickness distribution of thin films on solid substrates. IE has drawn attention because it provides aspects of both ellipsometry and optical microscopy imaging. The IE method is based on integrating a microscope and charge-coupled device (CCD) or complementary metal oxide semiconductor (CMOS) array into an ellipsometer to acquire ellipsometric images over a microscopic area of a surface. By using a CCD camera as the detector and illuminating the sample at a plurality of locations or directions, IE can provide images of and A rather than optical images like that are obtained with a conventional microscope. In this way, it is possible to carry out an ellipsometric analysis over a large field of view to obtain a thickness distribution image of a layer on a surface. The main advantage of imaging ellipsometry is that every point in the field of view of the beam reflected from the target region is measured at the same time with high spatial resolution. However, in prior art systems, IE data is typically collected at a single wavelength, and when compared with spectroscopic ellipsometry the accuracy, resolution, and dynamic range of the technique is poor. Prior art ellipsometry systems typically incorporate a rotating analyzer for polarization state detection. However, there are three limitations with this approach. First, a rotating analyzer cannot detect depolarization by the sample or by optical element imperfections. When such depolarization effects are not recognized and modeled, they lead to experimental errors. Second, the sign of Δ is ambiguous, which means that there are two possible solutions for Δ (e.g., Δ can only be measured from 0° to 180'). Third, there is low sensitivity to Δ for nearly linearly polarized light entering the rotating analyzer, which occurs when Δ is near 0°, 180°, and 360°. This is a critical limitation for thin-film semiconductor applications, since Δ is in the range of poor sensitivity for silicon (~180°).

Spectroscopic Ellipsometry

Spectroscopic ellipsometry (SE) devices provide data at multiple wavelengths and they are widely used in the semiconductor and microelectronic industries as a non-contact and non-destructive optical technique for thin film characterization. In typical prior art spectroscopic ellipsometer systems, the probing wavelength is changed and the ellipsometry measurement is repeated at each new wavelength. In some prior art devices, a polychromatic light beam having a broad range of wavelengths is directed to a sample, and the reflected beam is diffracted to a photodetector array by a diffraction grating or a prism and multi-wavelength ellipsometry measurements are performed on each of the diffracted beams at the same time. SE has become increasingly important for ultrathin film measurements because of its high sensitivity from the phase component, of the optical beam and is routinely used for measuring gate dielectrics in the semiconductor industry, diamond-like carbon films in magnetic data storage devices, and monolayer biological films. SE can be applied to a wide range of industrial and research applications in which specular reflection is produced from the sample of interest. An example is described in U.S. Pat. No. 6,650,415 which describes four elaborate embodiments in which ellipsometry data is measured at a plurality of angles and a plurality of wavelengths in order to analyze a sample. The teachings of this patent are hereby incorporated herein by reference.

What is needed is a spectroscopic ellipsometry system with increased spatial resolution, speed, and wafer coverage.

SUMMARY OF THE INVENTION

The present invention combines spectroscopic and imaging ellipsometry into a single system for high spatial resolution thin film measurement. The system includes a rotating compensator and a beam splitter so that spectroscopic and imaging ellipsometric data can be collected simultaneously with the same measurement beam reflected from a sample. Collecting ellipsometric data sets simultaneously at a narrow bandwidth but with microscopic spatial resolution and also collecting ellipsometric data at a broad set of bandwidths increases the information content for analysis and affords a substantial increase in measurement performance. A rotating compensator creates, from a linearly polarized illumination beam, a range of polarization from linear to circular. A small target region (such as a few square millimeters) of the sample is illuminated by the beam, created by the rotating compensator, at a single angle at or near Brewster's angle. Imaging ellipsometric measurements are made of the reflected beam for the small region at a narrow spectral range, such 615+/−5 nm for each of a plurality of compensator angular positions, and ellipsometric measurements are simultaneously also made of the reflected beam at a wide spectral range (such as from 200 nm to 1700 nm) for each of the same compensator angular positions. An XYZ stage adjusts the position of the sample between target region measurements so that (1) measurements can be made of only selected target regions of the sample or that (2) measurements can be made of all of the regions of the sample. Preferred embodiments of this metrology system and method provides the benefits of very high-speed spectroscopic ellipsometric examination of polarized light reflecting from a sample (i.e. high-speed, accuracy, resolution, and repeatability) and ellipsometric imaging (i.e. spatial resolution and sample coverage) while eliminating the limitations of the individual techniques. The disclosed optical system and method for thin film measurement is fast and nondestructive, with high sensitivity and reproducibility. Simultaneous collection of both spectroscopic and imaging ellipsometric data sets with the same measurement beam increases the information content for analysis and affords a substantial increase in speed and measurement performance.

DETAILED DESCRIPTION OF PREFERRED EMBODIMENTS

Figure 1:
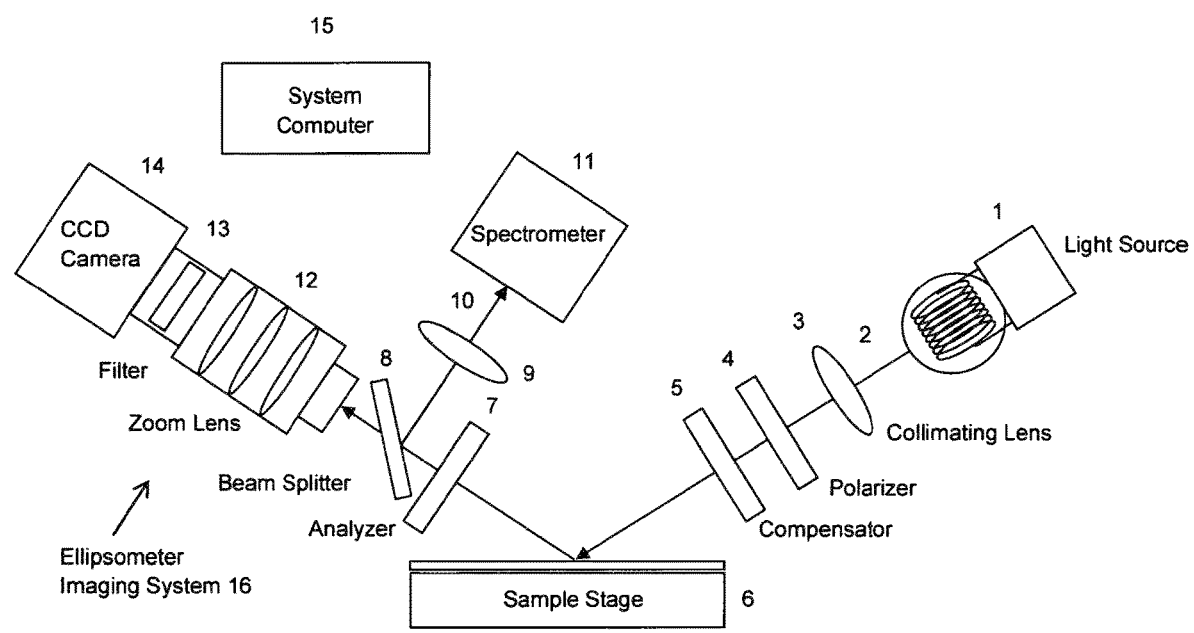
FIG. 1 is a drawing of a preferred embodiment of the present invention showing features of a preferred imaging spectroscopic ellipsometer system.

A preferred embodiment of the present invention is shown in FIG. 1. FIG. 1 is a schematic diagram of the preferred spectroscopic ellipsometer thin film imaging system with a rotating compensator. Simultaneous collection of both spectroscopic ellipsometric data and imaging ellipsometric data sets with the same measurement beam increases the information content for analysis and affords a substantial increase in measurement performance. This metrology system and method provides the benefits of very high speed spectroscopic examination of polarized light reflecting from a sample (i.e. high speed, accuracy, resolution, and repeatability) and ellipsometric imaging (i.e. spatial resolution and sample coverage) while eliminating the limitations of the individual techniques.

General ellipsometric hardware systems and methods with rotating compensator design have been described previously by one of the present inventors and another in U.S. Pat. Nos. 7,505,133 and 8,319,966 which are hereby incorporated herein by reference. As shown in FIG. 1 preferred embodiments of the present invention include light source 1 which is connected to a power supply and emits broad band light for illumination. The illumination light passes through a fiber 2 and lens 3 to collimate the incident light. After the collimating lens, the collimated light beam is directed through a rotatable polarizer 4 and a rotatable compensator 5 to a sample positioned on automated XYZ sample stage 6 adapted to place small target regions, of the sample, one at a time, in the path of the collimated light beam. The incident light then reflects off the small target region then passes though rotatable analyzer 7 to beam splitter 8. In a preferred embodiment, the small target region is a 2 mm×7 mm mapping region. For silicon applications, the angle of incidence is preferably fixed near 70° since this is near the silicon Brewster angle and provides maximum sensitivity. Beam splitter 8 reflects a portion of the light through a collection lens 9 and fiber 10 to spectrometer system 11 (comprising a dispersive element and a linear 2048-pixel CCD array) for spectroscopic intensity measurement. The portion of light passing through the beam splitter is directed to a microscopic ellipsometric imaging system 16 including variable zoom optics 12 and band-pass filter 13 and into a two-dimensional 307,200 (480×640) pixel CCD camera 14 for ellipsometric imaging. The wavelength selective filter 13 is preferably centered at 615 nm with a bandwidth of 10 nm. Intensity spectra and intensity images are collected simultaneously by the spectrometer system 11 and the microscopic ellipsometric imaging system 16. These data are collected at a plurality of different angular positions of the compensator 5. The product having the thin film resting on the sample stage is referred to herein as the "sample". Analysis of data from imaging system 16 provides Ψ and Δ data at a narrow wavelength range, and analysis data from spectrometry system 11 provides Ψ and Δ data over a wide range of wavelengths. The data may be obtained for every target position on the sample or as many selected target positions as desired. Model-based regression and/or other simpler techniques may be utilized to determine film thickness images and other properties of the film and the sample.

Light Source

The light source 1 is a broadband light source that produces a spectrum of polychromatic light over a predetermined wavelength range of interest. For semiconductor applications, a wavelength range of interest would preferably include 200-1700 nm. The preferred embodiment uses a combined deuterium/halogen light source to produce broadband light throughout the 200-1700 nm wavelength range of interest. The light from the light source is directed through a 300 micron diameter glass fiber 2 and collimated by a lens 3, such as an achromatic lens or a focusing mirror.

Polarizer

The incident light beam is directed through a rotatable polarizer 4, which is preferably fixed at 45 degrees relative to the plane of illumination and reflection, to create a known polarization state (i.e. approximately half p polarized and half s polarized). In the preferred embodiment, the polarizer is made from calcite and rotated by an electric motor and controller to achieve the desired azimuth angle so that the linearly polarized beam exiting the polarizer 4 is at a known angle (i.e. preferably 45 degrees) with respect to the plane of incidence.

The Compensator

The beam is then directed through a rotatable compensator 5, which preferably is a quarter wave plate, which introduces relative phase delays between the successive orthogonal polarizer components. The amount of phase retardation produced by the compensator is a function of the wavelength, material dispersion of the compensator material, and thickness of the compensator. In the preferred embodiments, the compensator 5 is a mica quarter waveplate and rotated by an electric motor and controller to eight or sixteen known angles with respect to the plane of incidence, at which data is collected. So, for example, if data is to be collected at eight angular rotations (45 degrees each) on each revolution of the compensator, the target region of the sample will be illuminated with four beams of approximately linear polarization and four beams of approximately circular polarized light. If data is to be collected at sixteen angular rotations (22.5 degrees each) on each revolution of the compensator, the target region of the sample will be illuminated with four beams of approximately linear polarization and four beams of approximately circular polarized light and eight beams of approximately elliptical polarization. The rotation of the compensator may be continuous or in steps of 45 or 23.5 degrees. Data is preferably recorded at these positions of the compensator.

Reflection from the Sample

The incident beam is reflected from the sample of interest symmetrically at an oblique angle equal to the angle of incidence. In the preferred embodiment, the light is incident on the sample at an angle of 70° since this is near the Brewster angle for silicon and provides the maximum sensitivity to the sample properties.

The Sample Stage

The sample is placed on an XYZ stage controlled by electric stepper motors with one micron resolution in all axes (X, Y, and Z). Sample stage 8 may be controlled to collect image data at every position on the sample or at only selected positions such as shown those in FIG. 2. Based on well-known ellipsometric principles, the circular polarization states of the reflected beam will change after interacting with the sample and will be monitored by spectrometer system 11 and camera imaging ellipsometric system 16. The data is recorded and stored by the system computer 15.

The Analyzer

The beam reflected from the sample then passes through a rotatable polarizer 7 which is made from calcite and is preferably rotated by an electric motor and a controller to achieve the desired azimuth angle of at least 45° relative to the plane of incidence and reflection. Polarizer 7 is also referred to as an analyzer.

Beam Splitter

In the preferred embodiment, a beam splitter 8, made from two triangular glass prisms glued together to form a cube, reflects a portion of the light to spectrometer 11 and passes a portion of the light to the ellipsometer imaging system 16.

The Spectrometer System

The reflected potion of the beam passes through an achromatic collection lens 9 and into a 600 micron diameter glass fiber 10. The reflected light is directed to a spectrometer 11 for spectroscopic intensity measurement. The spectrometer 11 includes a diffraction grating to angularly spread the beam as a function of wavelength over the linear 2048-pixel CCD array. The spectrometer 11 measures the intensity of the different wavelengths of light reflecting from the sample throughout the wavelength range of interest that pass through the analyzer 7.

The Imaging System

The portion of the reflected beam passing through the beam splitter is directed through variable zoom optics 12 to produce a ellipsometric image of a 2 mm×7 mm mapping region of the sample. In the preferred embodiment, a zoom lens allows the focal length and angle of view to be varied while the focus is maintained. The light then passes through a band-pass filter 13 and into the pixels of CCD camera 14 for ellipsometric imaging. In Applicant's prototype embodiment, the wavelength selective filter is centered at 615 nm with a bandwidth of 10 nm. It should be noted that this wavelength range can be easily changed with a suitable filter to optimize ellipsometric sensitivity for the sample of interest. In the present embodiment, the ellipsometric intensity images are measured with a black and white CCD camera 14 with 640×480 individual pixel elements. It should be noted that higher resolution CCD cameras can be used to obtain higher spatial resolution for a given imaging area.

Simultaneous Collection of Data

Intensity spectra from the detector 11 and intensity images from CCD camera 14 are preferably collected simultaneously at eight or 16 different angular positions of the compensator 5. A computer performs a Fourier analysis of the spectroscopic intensity data from detector 11 to determine the ellipsometric parameters Ψ and Δ as a function of compensator position. Simultaneously, spectrometer 11 is recording all of the wavelengths of the beam reflecting from the region of the sample being monitored including the 10 nm spectral region specifically monitored by the camera 14 of the ellipsometry system. From detector 11, Ψ and Δ values are available as a function of wavelength for each 2 mm×7 mm target position. Detector 11 does not provide spatial resolution within the 2 mm×7 mm target regions.

Fourier analysis of the intensity images from CCD camera 14 provides spatial images of the ellipsometric parameters Ψ and Δ with microscopic precision within each of the 2 mm×7 mm target regions. Model-based regression of the spectroscopic Ψ and Δ values permits very accurate values of film thickness and refractive index to be deduced for the sample. This physical information about the sample is then used to constrain the regression analysis of the Ψ and Δ images to provide an image of the thickness distribution of the film. Therefore, the film thickness of the entire wafer can quickly be measured with microscopic spatial precision of about 10.9 μm in the X direction and about 4.2 μm in the Y direction.

Importance of Angle of Incidence

Minimizing angle of incidence errors over the measurement region is essential for accurate quantification of the surface thickness distribution. The incident light is collimated to ensure that the angle of incidence is constant over the entire test surface. A calibration of the angle of incidence can be performed by measuring $SiO_2$/Si samples of varying oxide thickness. In this way errors in the angle of incidence, particularly in the x direction, can be minimized.

Applicant's Prototype Demonstration

Figure 2:
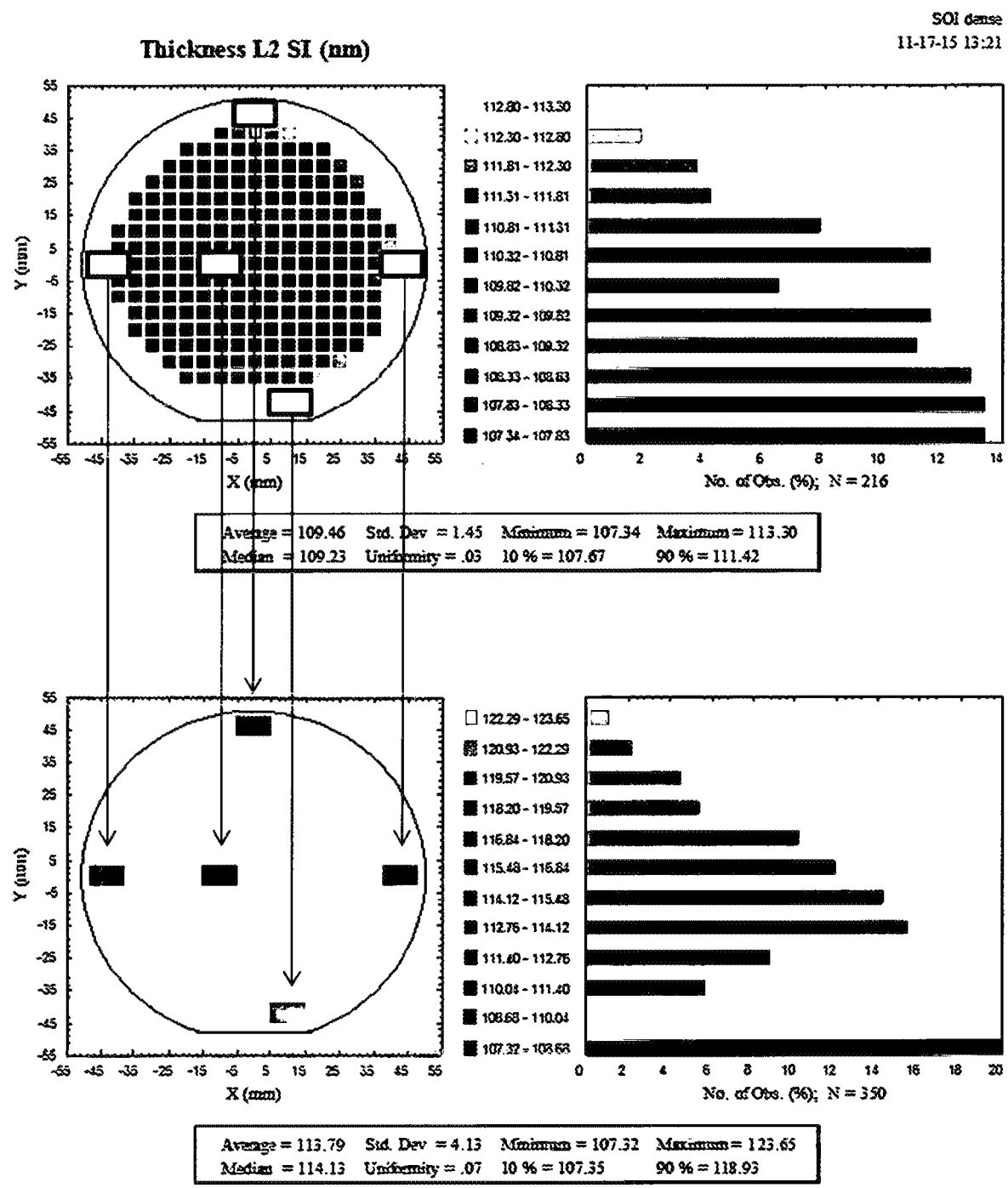
FIG. 2 is a spectroscopic reflectometric thickness map (216 points) of an SOI wafer. Also, as shown at the bottom of FIG. 2, five smaller regions of the SOI wafer (top, bottom, left, right, and center) were mapped with dense scans using the prior art reflectometry device (2 mm×7 mm mapping area, 50 μm spot size, 0.5 mm step size, 70 points.
Figure 3:
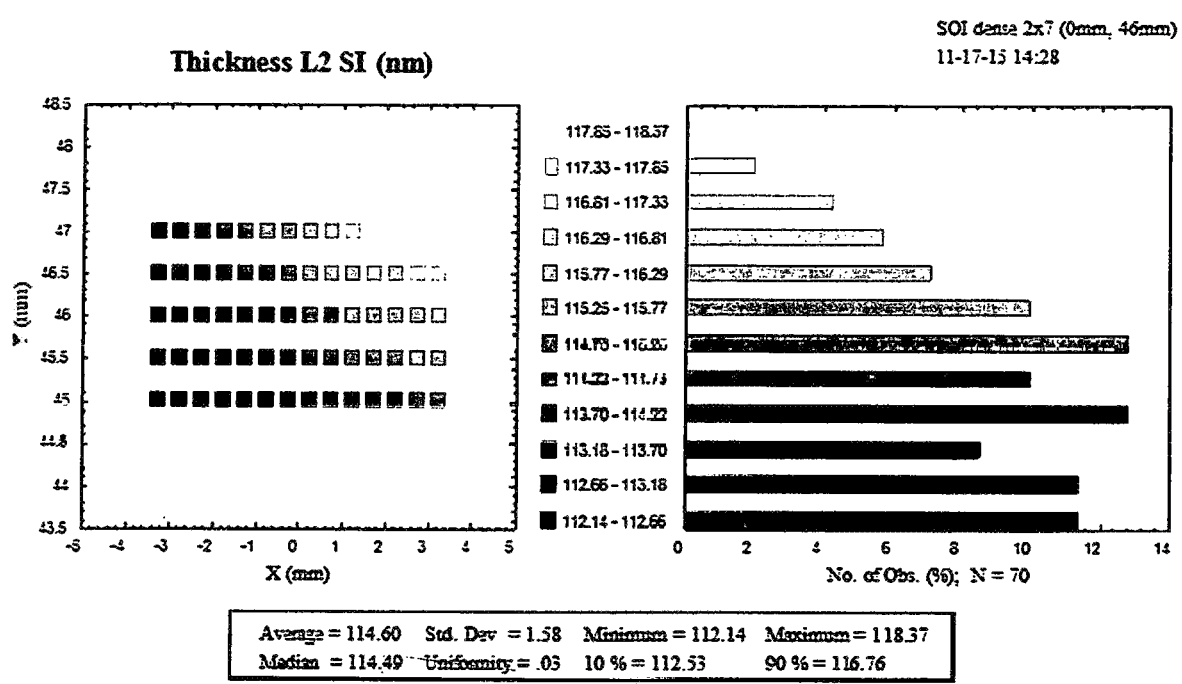
FIG. 3 compares prior art and preferred embodiment images of a portion of a wafer located at the top of the wafer as shown in FIG. 2.
Figure 4:
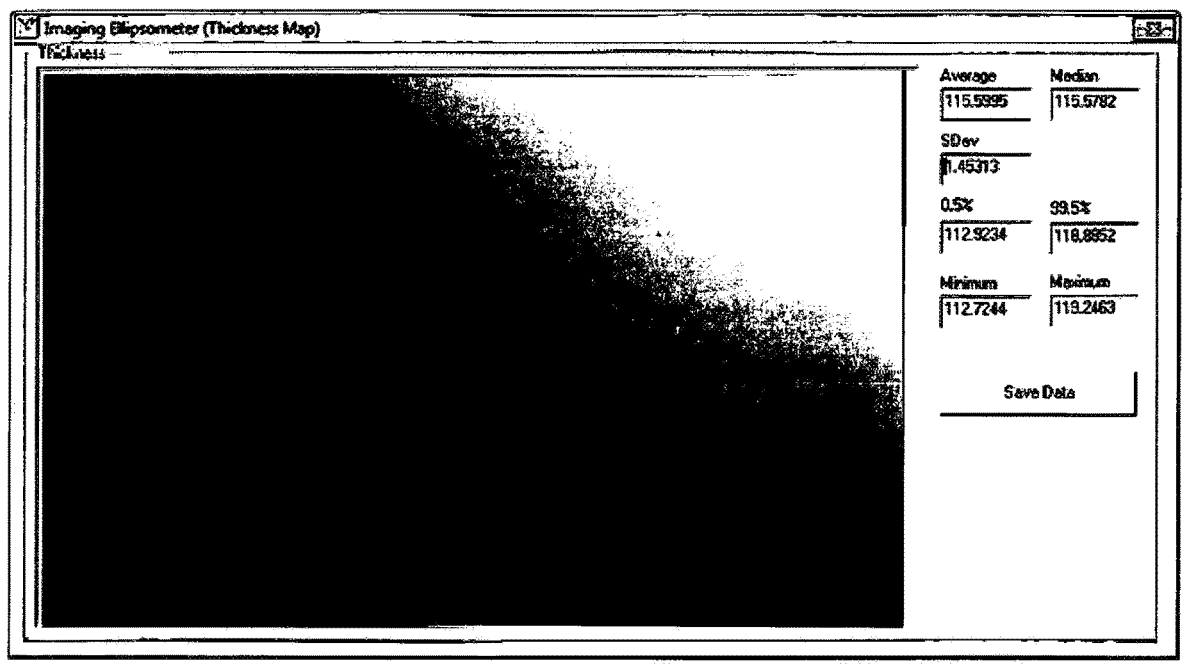
FIG. 4 also compares prior art and preferred embodiment images of a portion of a wafer located at the top of the wafer as shown in FIG. 2.
Figure 5:
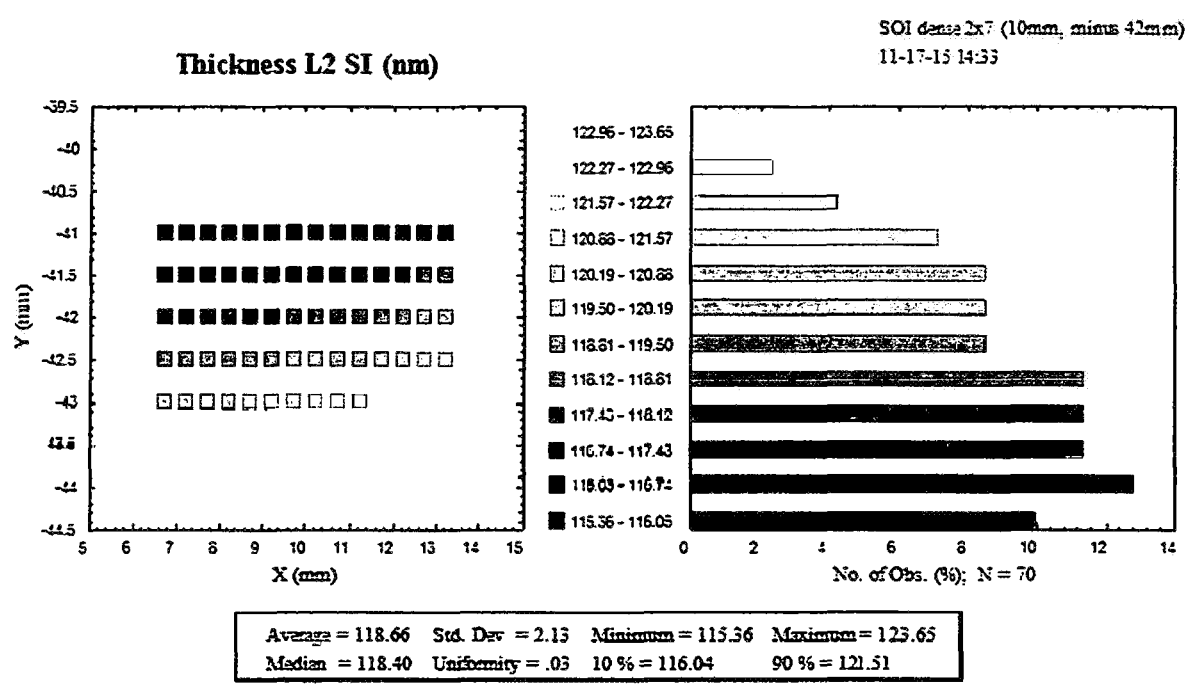
FIG. 5 compares prior art and preferred embodiment images of a portion of a wafer located at the bottom of the wafer as shown in FIG. 2.
Figure 6:
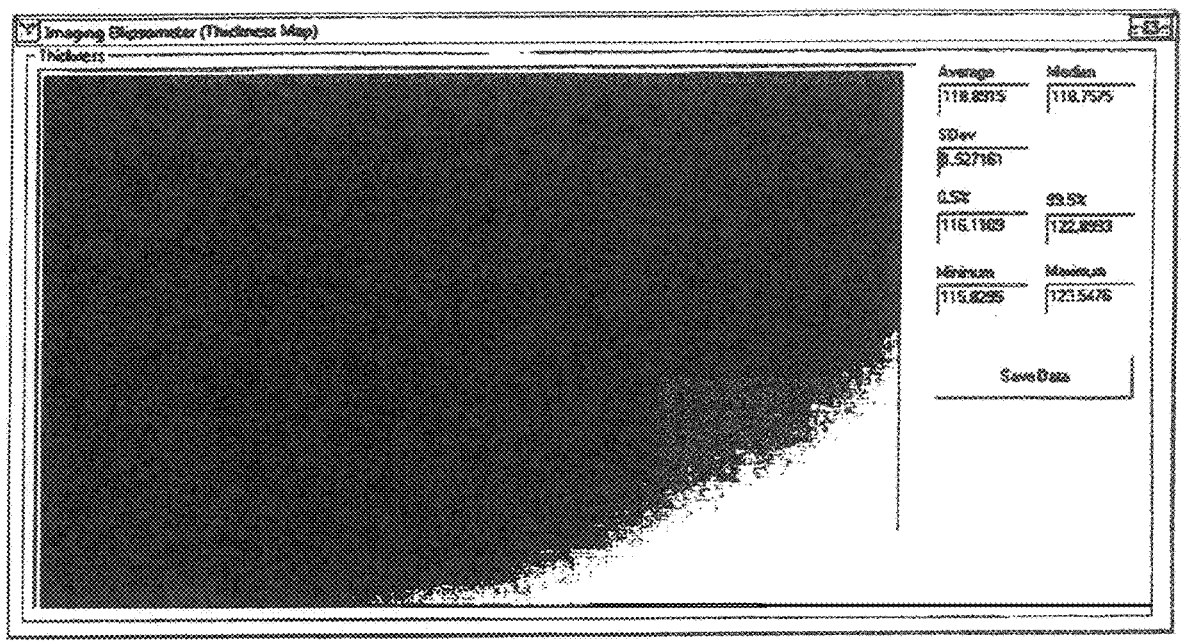
FIG. 6 also compares prior art and preferred embodiment images of a portion of a wafer located at the bottom of the wafer as shown in FIG. 2.
Figure 7:
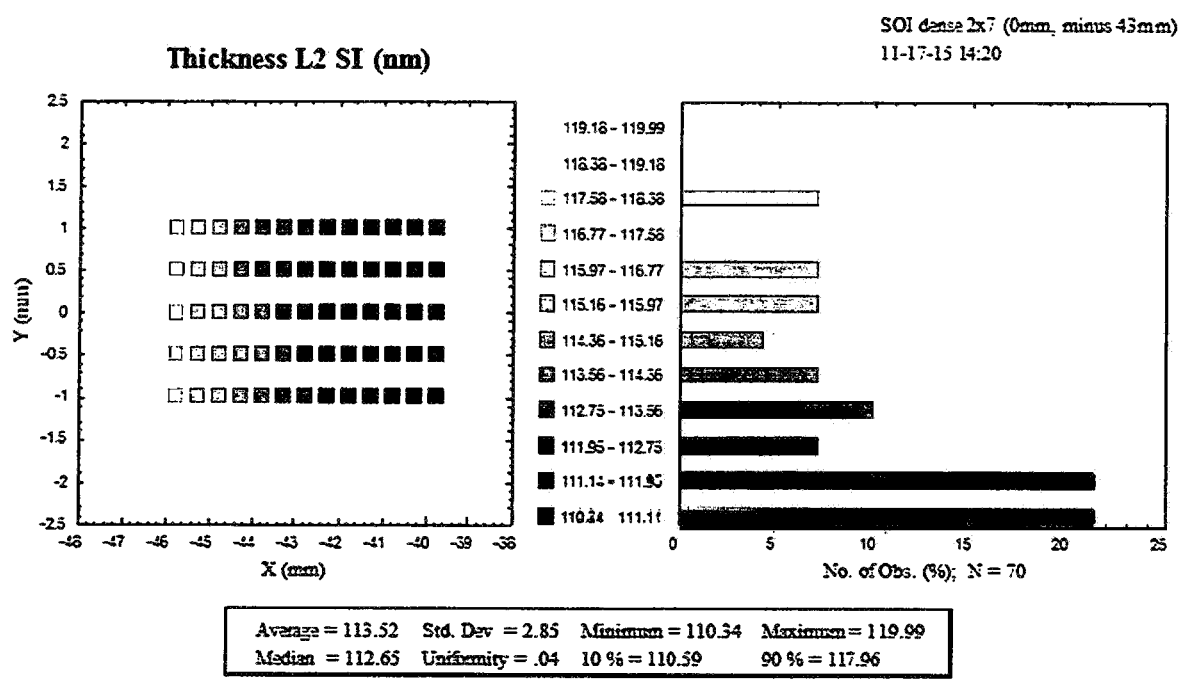
FIG. 7 compares prior art and preferred embodiment images of a portion of a wafer located at left of the wafer as shown in FIG. 2.
Figure 8:
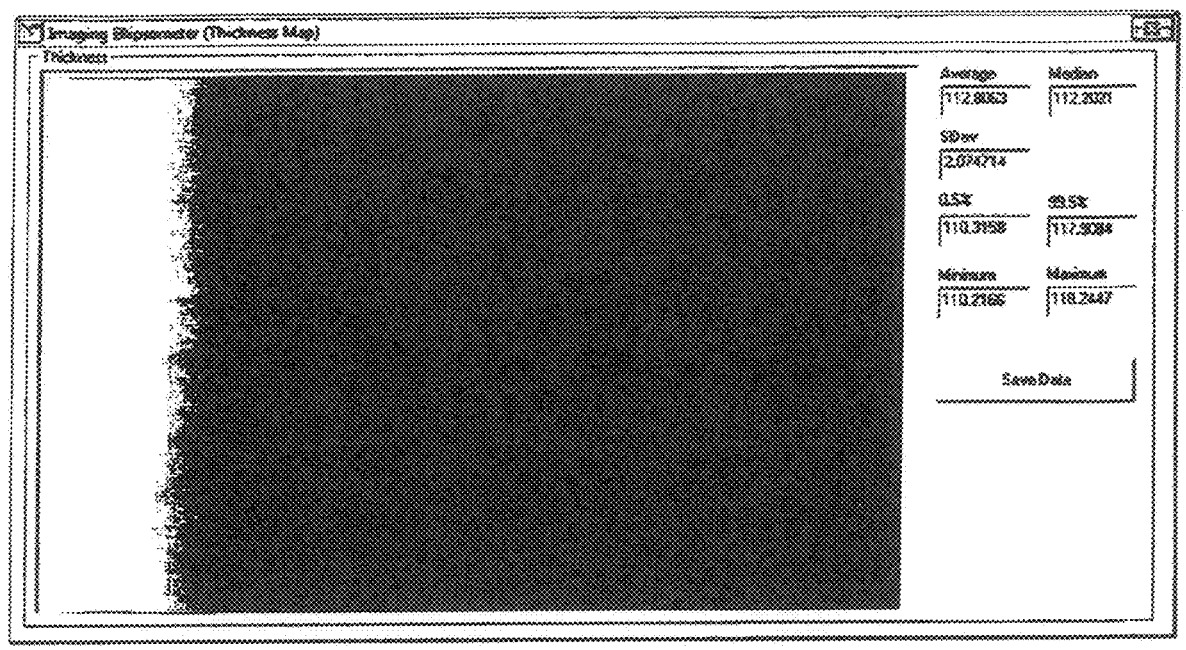
FIG. 8 also compares prior art and preferred embodiment images of a portion of a wafer located at left of the wafer as shown in FIG. 2.
Figure 9:
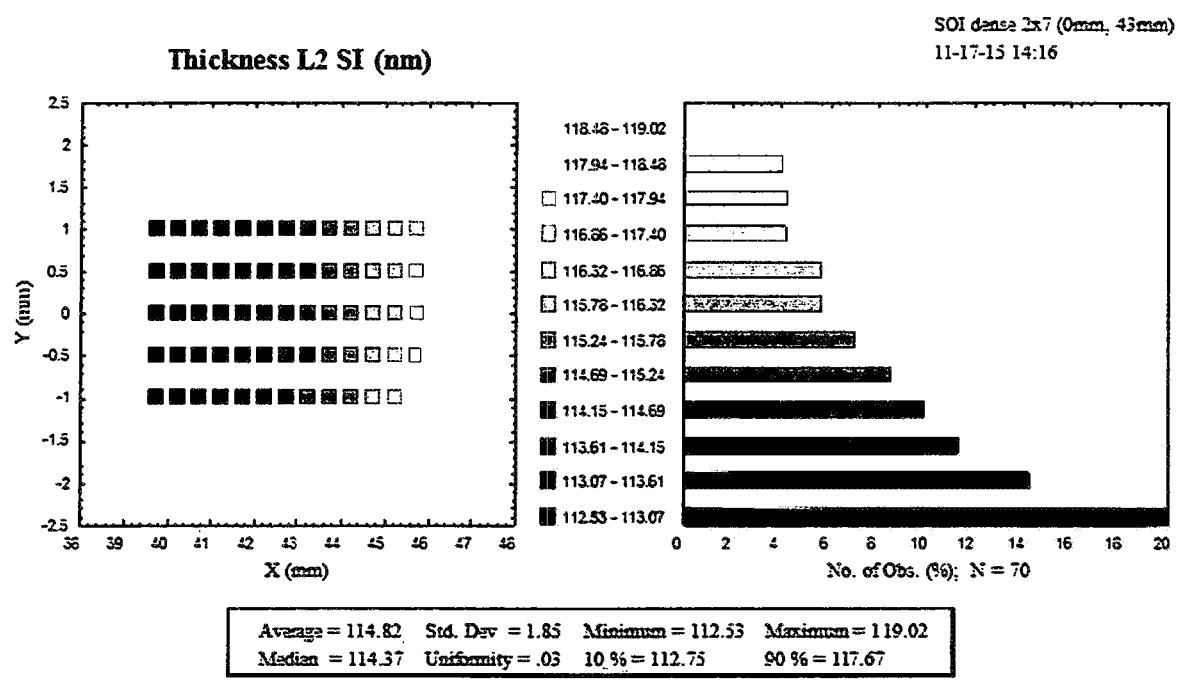
FIG. 9 compares prior art and preferred embodiment images of a portion of a wafer located at the right of the wafer as shown in FIG. 2.
Figure 10:
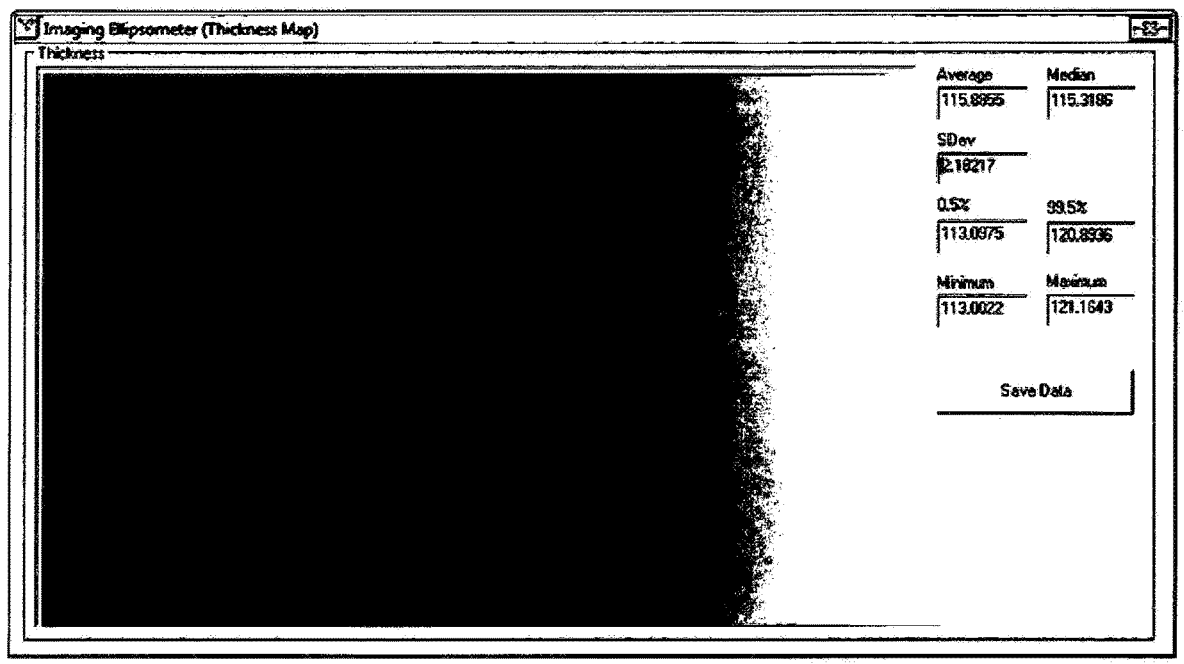
FIG. 10 also compares prior art and preferred embodiment images of a portion of a wafer located at the right of the wafer as shown in FIG. 2.
Figure 11:
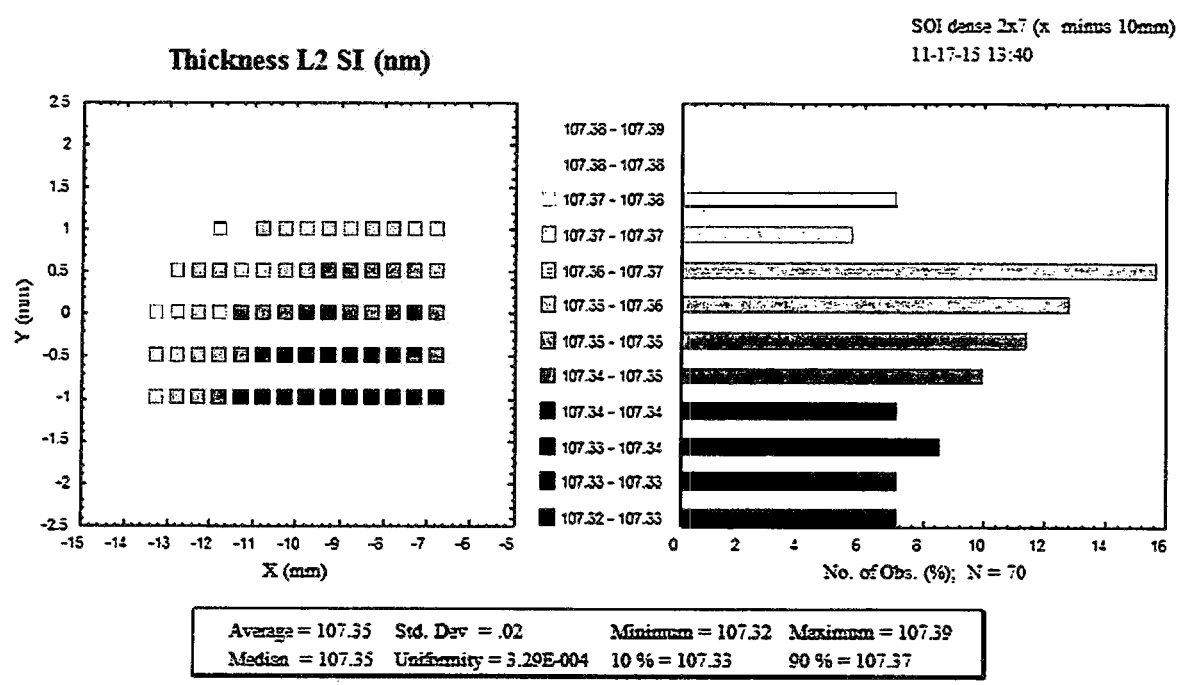
FIG. 11 compares prior art and preferred embodiment images of a portion of a wafer located at the center of the wafer as shown in FIG. 2.
Figure 12:
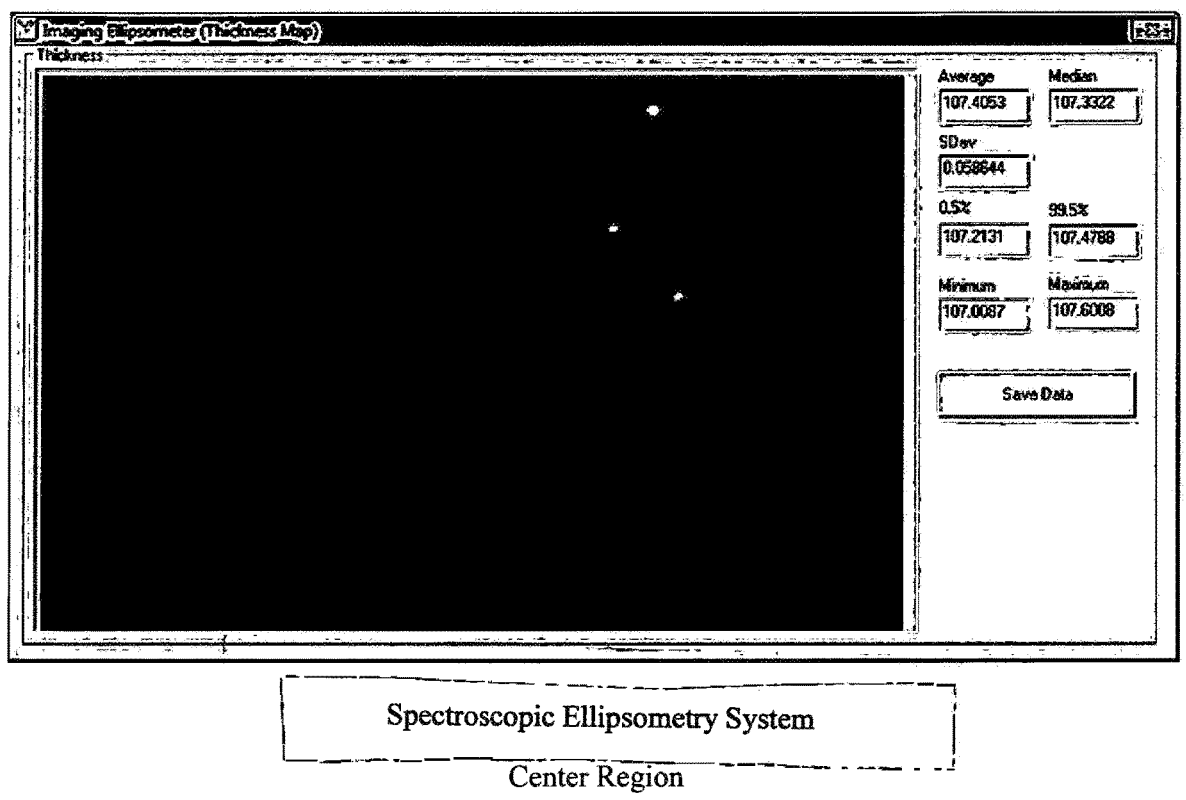
FIG. 12 also compares prior art and preferred embodiment images of a portion of a wafer located at the center of the wafer as shown in FIG. 2.

To demonstrate the feasibility of the spectroscopic and imaging ellipsometer system and method, a silicon-on-insulator (SOI) sample was measured using the apparatus described in FIG. 1 and compared with spectroscopic reflectometry measurements from a prior art commercially available instrument (FilmTek™ 2000 PAR-SE). The SOI sample consists of a silicon substrate, a $SiO_2$ layer with nominal thickness of 800 Å, and a Si layer with nominal thickness of 1000 Å. A 216 point thickness map of the SOI wafer measured with reflectometry displays a silicon thickness variation of several Angstroms from wafer center to edge as shown in FIG. 2. FIG. 2 is a spectroscopic reflectometry thickness map (216 points) of an SOI wafer. The SOI sample consists of a silicon substrate, $SiO_2$ layer with nominal thickness of 800 Å, and a Si layer with nominal thickness of 1000 Å and displayed a silicon thickness variation of several Angstroms from wafer center to edge. Also, as shown at the bottom of FIG. 2, five smaller regions of the SOI wafer (top, bottom, left, right, and center) were mapped with dense scans using the prior art reflectometry device (2 mm×7 mm mapping area, 50 μm spot size, 0.5 mm step size, 70 points). The silicon thickness at the edges of the wafer shows significant variation in these scans, while the center region is quite uniform.

The spectroscopic reflectivity measurements with the prior art FilmTek 2000 PAR-SE instrument for the same five regions were compared with measurements using a prototype spectroscopic and imaging ellipsometer system of the present invention. The results are shown in FIGS. 3 through 12 [i.e. top region (FIGS. 3 and 4), bottom region (FIGS. 5 and 6), left region (FIGS. 7 and 8), right region (FIGS. 9 and 10), and center region (FIGS. 11 and 12)]. The measurement beam size was set to 2 mm×7 mm, and the spectroscopic ellipsometric data was collected between 400-900 nm (i.e. near UV to near IR). The band-pass filter was centered at 615 nm and a black and white CCD camera with 640×480 pixels was used for collecting the ellipsometric images. With a 2 mm×7 mm field of view, the resolution per pixel is 10.9 µm in the x axis and 4.2 µm in the y axis for the imaging data. Simulation and analysis of the measured Psi and Delta data was performed using SCI's FilmTek™ software, an optical thin film modeling package based on Abelès 2×2 matrix method. (See: F. Abelès, "Research on the propagation of electromagnetic waves in stratified media—application to thin films," Ann. Phys. 5, 596 (1950), U.S. Pat. Nos. 5,889,592 and 5,999,267.)

Comparison of the measured data for the five regions shows excellent correlation between the commercial spectroscopic reflectometer and the spectroscopic and imaging ellipsometer system. FIGS. 3 through 12 show the same 2 mm×7 mm regions of the wafer mapped with both techniques. FIGS. 3, 5, 7, 9, and 11 respectively show a silicon thickness map of the five regions (top, bottom, left, right, and center of the wafer) using the prior art reflectometry device. Each region showing a 2 mm×7 mm mapping area, 50 µm measurement beam size, 0.5 mm step size, and 70 points (14 columns×5 rows). And each of FIGS. 4, 6, 8, 10 and 12 shows a silicon thickness map of the same corresponding region measured with the prototype spectroscopic and imaging ellipsometer of the present invention.

Both the prior art commercial instrument and the embodiment of the present invention utilize color to indicate thin film thickness. Thickness values are given in nanometers. FIGS. 2 through 12 are black and white copies of color print-outs produced by the system computers in prior art FilmTek reflectometry system and in embodiments of the present invention. Both systems use a spectrum of shades of colors from red, orange, yellow, green and blue that represent the thicknesses shown in the drawings, from 117.85-118.37 (red) to 112.14-112.66 (blue). The embodiment of the present invention uses colors to represent film thicknesses. The colors are not evident in these black and white copies, but Applicants represent that the computer generated color maps clearly match the color images produced by the prior art FilmTek unit. The computer of this preferred embodiment also calculates average and medium thickness, 0.5% and 99.5% and maximum and minimum thickness values and the standard deviation for each of the five mapping areas. These values are shown in FIGS. 4, 6, 8, 10 and 12.

While the spectroscopic reflectometry measurements took several minutes per map and only measured a small portion of each 2 mm×7 mm region, the spectroscopic and imaging ellipsometry system of the present invention measured the entire 2 mm×7 mm region in less than a few seconds. When compared with conventional spectroscopic reflectometry or ellipsometry techniques, the spectroscopic and imaging ellipsometer system and method provides improved wafer coverage, spatial resolution, and speed while maintaining high thickness sensitivity and reproducibility.

Advantages of the Present Invention

Consider a typical process control measurement for a 300 mm SOI wafer, where it is necessary to monitor silicon thickness uniformity over large areas (e.g. wafer scale) and silicon thickness uniformity over small areas (e.g. transistor scale). Conventional methods such as spectroscopic ellipsometry or reflectometry could provide a measure of the thickness variation for the wafer scale, but would not readily provide uniformity information for smaller scales due to the minimum spot size achievable and the long measurement times required for such high-density mapping measurements. Alternatively, measurement of a wafer map with the spectroscopic and imaging ellipsometer system readily provides thickness uniformity information over large and small scales, including $SiO_2$ thickness, silicon thickness, the average silicon thickness for each IE measurement location, the standard deviation of the silicon thickness for each IE measurement location, the maximum silicon thickness for each IE measurement location, and the minimum silicon thickness for each IE measurement location. Additionally, the IE thickness images are saved at each location of the wafer map for later review. In this fashion, a substantial increase in measured process control data is achieved with the spectroscopic and imaging ellipsometer system while maintaining measurement times that are commensurate with conventional ellipsometric methods.

Figure 13:
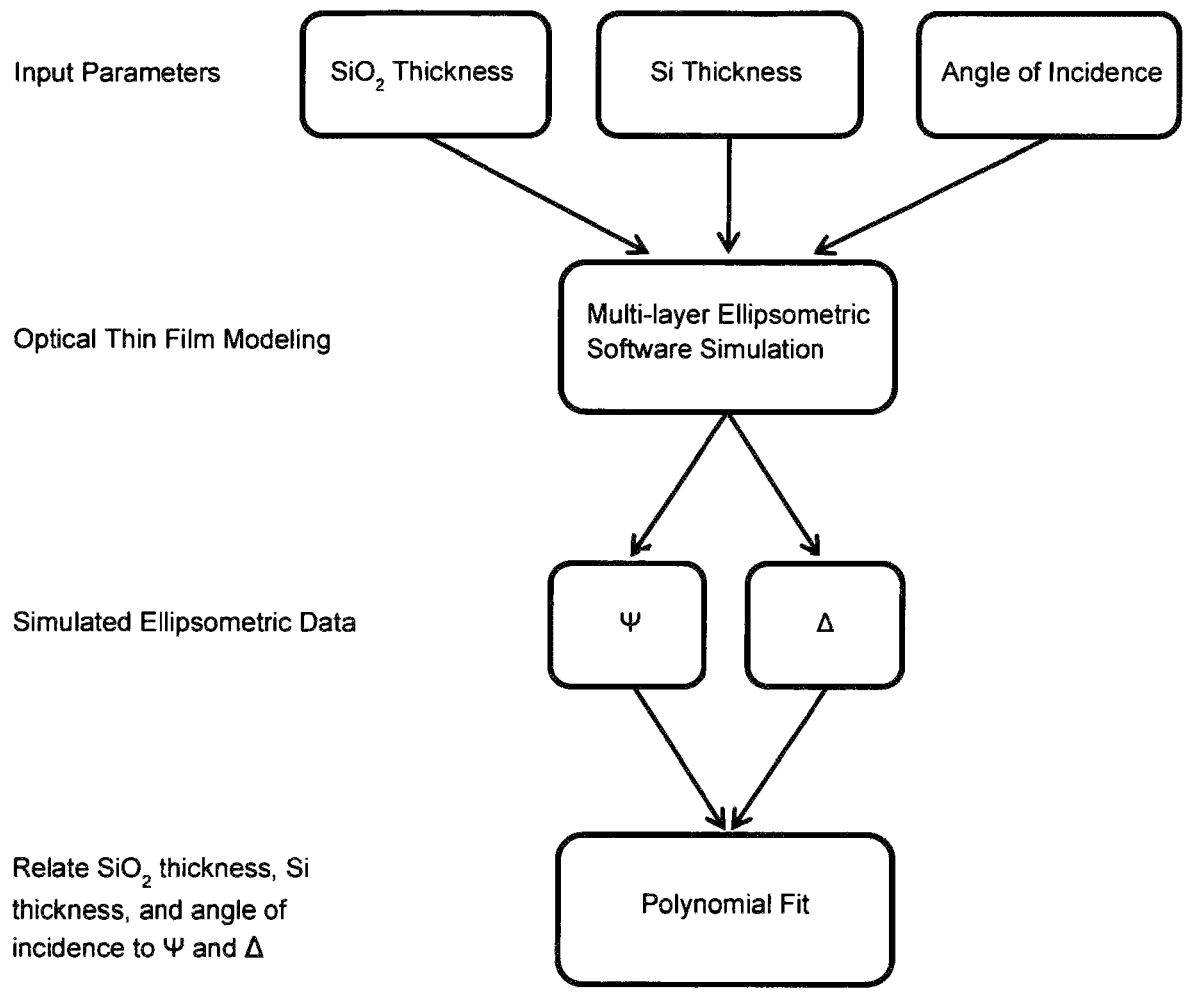
FIG. 13 is a flow diagram showing steps of a process for monitoring thin films of a silicon wafer. The input parameters of SiO2 thickness, Si thickness, and angle of incidence for an SOI film structure are related to simulated 'P and Ii values with a polynomial function.
Figure 14:
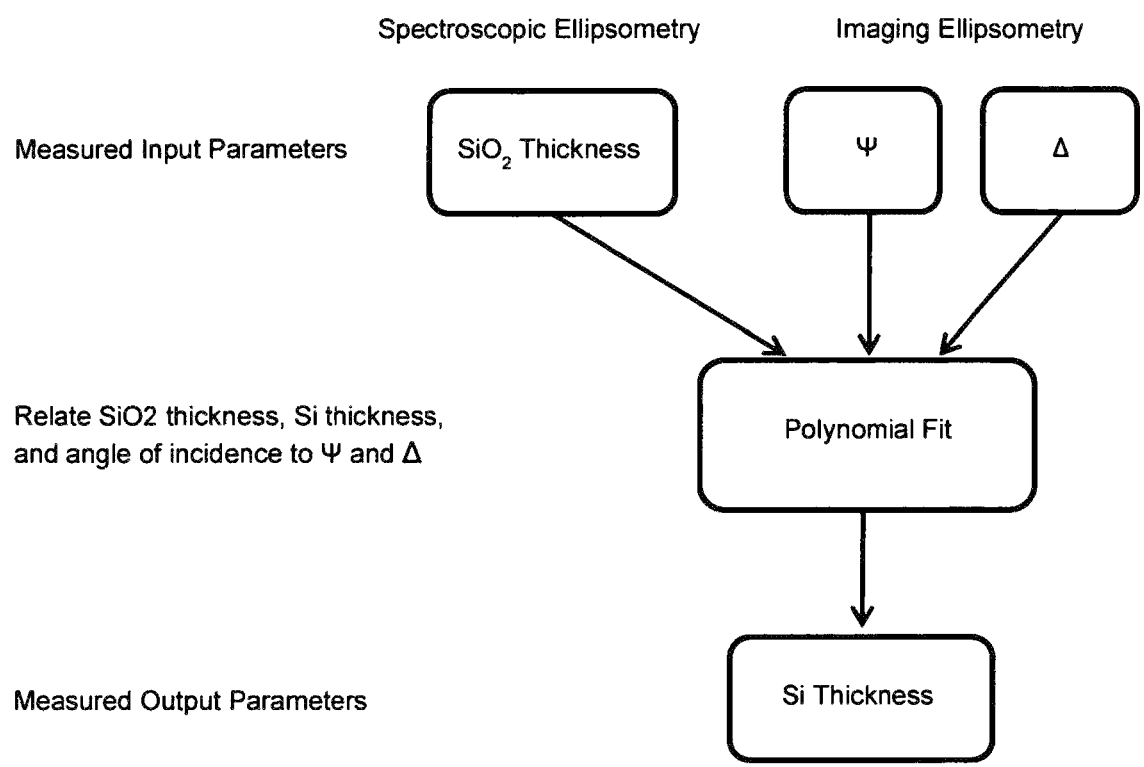
FIG. 14 is a flow diagram showing additional steps of a process for monitoring thin films of the process shown in FIG. 13. From input measurements of 'I', Ii, and oxide thickness, a polynomial function is used to—determine Si thickness instead of a time-consuming regression analysis of the 'P and Ii image data.
Figure 15:
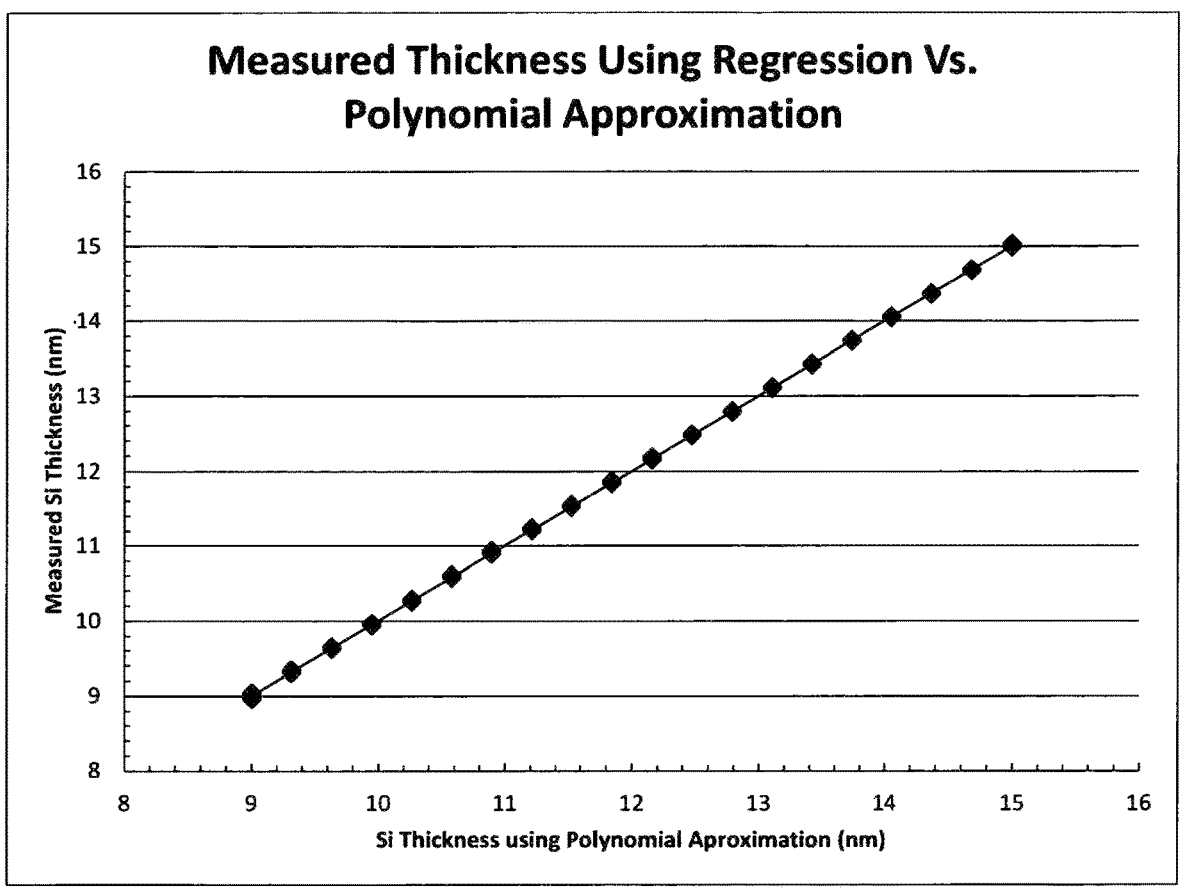
FIG. 15 compares results obtained with a preferred embodiment of the present invention with a full regression analysis. The graph displays the measured silicon film thickness using full regression analysis of the 'P and Ii data versus the polynomial approximation method. The polynomial approximation is in very good agreement with the full regression analysis.

Significant improvements in measurement speed can be obtained in the method of data analysis of the ellipsometric images. Obtaining the image of the film thickness distribution from the pixel by pixel regression analysis of the Ψ and Δ images requires significant computational time that increases with the number of pixels in the CCD camera. Alternatively, high speed conversion of the measured P and A images to film thickness can be obtained for known structures by relating the thickness of the film of interest to Ψ and Δ with a polynomial function. Consider the previous process control measurement for an SOI wafer. A flow chart for the polynomial approximation method for determining silicon thickness from the measured Ψ and Δ is shown in FIGS. 13 and 14. First, a polynomial function is created to relate the $SiO_2$ thickness, Si thickness, and angle of incidence for an SOI film structure to simulated Ψ and Δ values. After fitting the polynomial function for a particular film structure and thickness range; the function can be used to calculate Si thickness directly from input measurements of Ψ, Δ, and oxide thickness. The polynomial approximation method reduces computational time significantly compared to a point-by-point regression analysis of the ellipsometric images. A graphical comparison of the measured silicon film thickness using full regression analysis of the Ψ and Δ data versus the polynomial approximation method is shown in FIG. 15. The data shows the polynomial approximation is in very good agreement with the full regression analysis.

Variations

Although only a preferred embodiment of the present invention has been described above, persons skilled in this art will recognize that many variations are possible. For example, embodiments of the present invention can be used to characterize composition, roughness, depth, crystalline features, doping concentration, electrical conductivity and other material properties of thin films and surfaces. As stated above the preferred angle of incidence is Brewster's angle but other embodiments may include incident angles in the range of 50 to 75 degrees. Polarizer 4 may in some embodiments be positioned at angles other than 45 degrees such as between 5 degrees and 85 degrees. The preferred spectrometer is comprised of a diffraction grating and a linear CCD array but other spectrometers may also be substituted. Other broad band light sources could be substituted for the deuterium halogen light source such as other halogen sources, an LED source or a Xenon lamp. Preferred embodiments comprise two polarizers. These two polarizers could be rotatable or fixed but if rotatable they are normally fixed during film imaging. The compensator is rotated to a number of angular positions during the imaging processes. Normally, the rotations may be at equal angles or to a plurality of desired angles. The rotation of the compensator could be continuous with the computer controlling data collection at specific rotation angles of the compensator.

The reader should note that the spatial resolution for the imaging ellipsometer is readily controlled by changing the number of pixels in the CCD camera and/or changing the image field of view. Stitching multiple CCD cameras together with beam splitters would allow for a method of increasing the field of view without loss of spatial resolution. Additionally, a color or spectroscopic imaging ellipsometer can be designed by capturing the ellipsometric images with a color CCD camera and utilizing a 3 color band-pass filter rather than a single narrow wavelength band-pass filter. In this way, ellipsometric intensity image data can be collected at three different wavelengths simultaneously from a single image captured by the color CCD. The dynamic range of the camera can be increased significantly by changing the integration time (e.g. shutter speed) for each image. In the present configuration, the illumination beam is collimated to reduce angle of incidence variation over the measurement region. However, the incident light could be focused in order to maximize the angle of incidence variation in the x direction of CCD data collection. In this way, variable angle information in the x axis can be added to the imaging ellipsometric data.

Therefore, the scope of the present invention should be determined by the attached claims and not by the specific examples described above.

What is claimed is:

1. A high-speed imaging spectroscopic-ellipsometry apparatus for imaging thin films, the apparatus comprising:
   A) a light source configured to produce polychromatic light having a spectrum that includes a desired wavelength of interest,
   B) collimating optics configured to receive and collimate the polychromatic light to produce a collimated beam,
   C) a polarizer adapted to convert the collimated beam into a linearly polarized beam,
   D) a rotatable compensator adapted to convert the linearly polarized beam to a first circularly or elliptically polarized collimated beam at a broad range of wavelengths,
   E) an XYZ sample stage configured to position a sample subject to a spectroscopic ellipsometry measurement by reflecting the first circularly or elliptically polarized collimated beam so as to receive said first beam at the sample at an approximately Brewster's angle directly from the rotatable compensator and reflect the first circularly or elliptically polarized collimated beam thereby producing a reflected collimated beam and defining a plane of incidence and reflection,
   F) an analyzer adapted to receive the reflected collimated beam directly from the sample and to convert the reflected beam to produce a linearly polarized reflected beam having a linear polarization at an azimuth angle of 45 degrees relative to the plane of incidence and reflection to create both p-polarized light and s-polarized light,
   G) a beam splitter configured to receive light of said linearly polarized reflected beam from the analyzer and to spatially split said light into a first measurement beam and a second measurement beam,
   H) a spectrometer system positioned to receive the first measurement beam from the beam splitter and configured to effectuate spectrometric ellipsometric measurements in light of the linearly polarized reflected beam,
   I) ellipsometric optical components including a multi-pixel camera positioned to receive the second measurement beam from the beam splitter and configured to make ellipsometric imaging measurements in said light of the linearly polarized reflected beam, and
   J) a computer system operably cooperated with components of the apparatus and adapted to analyze information received from the rotatable compensator, the XYZ stage, the spectroscopic spectrometer system, and the ellipsometric optical components to carry out a plurality of imaging ellipsometry (IE) measurements for a plurality of measurement locations on the sample.

2. The imaging spectroscopic ellipsometry apparatus according to claim 1, wherein the ellipsometric optical components comprise a zoom lens, an optical filter, and a CCD camera adapted to produce ellipsometry images of spatial regions of the sample.

3. The imaging spectroscopic ellipsometry apparatus according to claim 1, wherein the spectrometer system comprises a lens, a dispersive element, and a multi-pixel detector configured to record spectral information in the linearly polarized reflected beam.

4. The imaging spectroscopic ellipsometry apparatus according to claim 3, wherein the multi-pixel detector comprises a linear CCD array.

5. The imaging spectroscopic ellipsometry apparatus according to claim 1, wherein, when the sample includes a thin film thereon, the computer is programmed to determine a film thickness uniformity, an average film thickness for each of said plurality of measurement locations, a standard deviation of film thickness for each of said plurality of measurement locations, the maximum substrate thickness for each of said plurality of measurement locations, and the minimum substrate thickness for each of said plurality of measurement locations.

6. The imaging spectroscopic ellipsometry apparatus according to claim 5, configured to accomplish each IE measurement of said plurality of IE measurements in time shorter than 5 seconds.

7. The imaging spectroscopic ellipsometry apparatus according to claim 1, wherein the computer is programmed to perform regression analysis to determine an amplitude ratio ($\Psi$) data and a phase difference ($\Delta$) data for the p-polarized light and the s-polarized light characterizing a thin film of the sample.

8. The imaging spectroscopic ellipsometry apparatus according to claim 7, wherein the plurality of measurement locations includes an entire effective surface of the sample.

9. The imaging spectroscopic ellipsometry apparatus according to claim 7, configured to create a polynomial function representing said thin film based on the $\Psi$ data and the $\Delta$ data.

10. The imaging spectroscopic ellipsometry apparatus according to claim 9, configured to calculate properties of said thin film with the use of said polynomial function directly from the $\Psi$ data and the $\Delta$ data.

11. The imaging spectroscopic ellipsometry apparatus according to claim 1, wherein the compensator is a quarter wave plate.

12. The imaging spectroscopic ellipsometry apparatus according to claim 1, configured to turn the compensator at eight or sixteen equal angular increments for each full rotation of the compensator.

13. The imaging spectroscopic ellipsometry apparatus according to claim 1, wherein an angle of incidence of said first ciruculary or elliptically polarized collimated beam at the sample deviates from the Brewster's angle, defined relative to a normal to a surface of the sample, by no more than 5 degrees.

14. The imaging spectroscopic ellipsometry apparatus according to claim 1, wherein the spectrometer system comprises a linear CCD array and a diffractive optical element.

15. A method for determining properties of a thin film on a sample with the use of a high-speed imaging spectroscopic-ellipsometry system, the method comprising:
  1) producing polychromatic light having a spectrum that includes a desired wavelength of interest with a light source;
  2) collimating said polychromatic light with collimating optics to produce a collimated beam of light;
  3) transforming the collimated beam of light into a linearly polarized collimated beam of light with the use of a polarizer;
  4) converting the linearly polarized beam of light to a first circularly or elliptically polarized beam of light at a broad range of wavelengths of said spectrum with a rotatable compensator;
  5) orienting a sample subject to a spectroscopic ellipsometric measurement with the use of an XYZ positioner such as
    to receive said first circularly or elliptically polarized beam of light directly from the rotatable compensator at an incidence angle within 5 degrees from the Brewster's angle, and
    to form a reflected collimated beam of light;
  6) at an analyzer, receiving said reflected collimated beam of light directly from the sample and transforming light of said reflected collimated beam of light to contain both p-polarized light and s-polarized light;
  7) at a beam splitter, spatially separating said light of the reflected collimated beam into a first measurement beam containing one of the p-polarized light and the s-polarized light and a second measurement beam containing the other of p-polarized light and said s-polarized light
  8) determining properties of a thin film of the sample by:
    carrying out spectrometric ellipsometric measurements with a spectrometer system positioned to receive the first measurement beam and a computer system that is operably cooperated with components of the apparatus and that is adapted to analyze information received from the compensator, the XYZ stage, the spectroscopic spectrometer system, and the ellipsometric optical components to produce a plurality of imaging ellipsometry (IE) measurements for a plurality of measurement locations on the sample; and
    performing ellipsometric imaging measurements with a combination of ellipsometric optical components positioned to receive said second measurement beam and with said computer system.

16. A high-speed imaging spectroscopic-ellipsometry apparatus for imaging thin films, the apparatus comprising:
  a. a light source configured to produce polychromatic light having a spectrum that includes a desired wavelength of interest,
  b. collimating optics configured to receive and collimate the polychromatic light to produce a collimated beam,
  c. a polarizer adapted to convert the collimated beam into a linearly polarized beam,
  d. a rotatable compensator adapted to convert the linearly polarized beam to a first circularly or elliptically polarized beam at a broad range of wavelengths,
  e. an XYZ sample stage configured to position a sample, which is subject to a spectroscopic ellipsometry measurement by reflecting the first circularly or elliptically polarized beam, so as to receive said first circularly or elliptically polarizaed beam at the sample at an angle within 5 degrees from the Brewster's angle and to reflect the first circularly or elliptically polarized beam at the sample thereby producing a reflected beam and defining a plane of incidence and reflection,
  f. an analyzer adapted to convert the reflected beam to produce a linearly polarized reflected beam having a linear polarization at an azimuth angle of 45 degrees relative to the plane of incidence and reflection to create both p-polarized light polarized and s-polarized light,
  g. a beam splitter configured to receive light in said linearly polarized reflected beam from the analyzer and to split said light into a first measurement beam and a second measurement beam,
  h. a spectrometer system optically connected with the beam splitter and configured to effectuate spectrometric ellipsometric measurements in light of the linearly polarized reflected beam,
  i. ellipsometric optical components including a multi-pixel camera optically connected with the beam splitter and configured to make ellipsometric imaging measurements in said light of the linearly pollarized reflected beam, and
  j. a computer system operably cooperated with components of the apparatus and adapted
    to analyze information received from the compensator, the XYZ stage, the spectroscopic spectrometer system, and the ellipsometric optical components to carry out produce a plurality of imaging ellipsometry (IE) measurements for a plurality of measurement locations on the sample, and
    when the sample includes a thin film thereon, programmed to determine a film thickness uniformity, an average film thickness for each of said plurality of measurement locations, a standard deviation of film thickness for each of said plurality of measurement locations, the maximum substrate thickness for each of said plurality of measurement locations, and the minimum substrate thickness for each of said plurality of measurement locations.

17. An apparatus according to claim 16, wherein the ellipsometric optical components comprise a zoom lens, an optical filter, and a CCD camera adapted to produce ellipsometry images of spatial regions of the sample.

18. An apparatus according to claim 16, wherein the spectrometer system comprises a lens, a dispersive element, and a multi-pixel detector configured to record spectral information in light of the linearly polarized reflected beam.

19. An apparatus according to claim 16, configured to accomplish each IE measurement of said plurality of IE measurements in time shorter than 5 seconds.

20. An apparatus according to claim 16, wherein the computer system is programmed to perform regression analysis to determine an amplitude ratio ($\Psi$) data and a phase difference ($\Delta$) data for the p-polarized light and the s-polarized light, said amplitude ratio data and said phase difference data characterizing a thin film of the sample.

21. An apparatus according to claim 16, wherein the compensator is a quarter wave plate.

22. An apparatus according to claim 16, configured to turn the compensator at eight equal angular increments or sixteen equal angular increments for each full rotation of the compensator.

* * * * *